June 29, 1965  A. G. BODINE, JR  3,191,911

FLUID DRIVEN MECHANICAL OSCILLATOR

Filed May 26, 1961  2 Sheets-Sheet 1

INVENTOR.
ALBERT G. BODINE JR.
BY
ATTORNEYS

June 29, 1965 A. G. BODINE, JR 3,191,911
FLUID DRIVEN MECHANICAL OSCILLATOR
Filed May 26, 1961 2 Sheets-Sheet 2
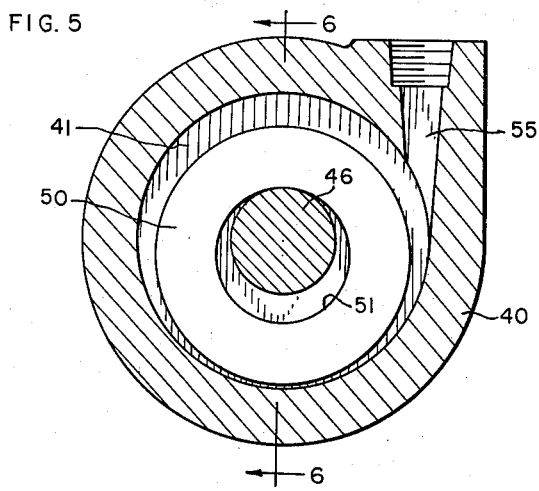
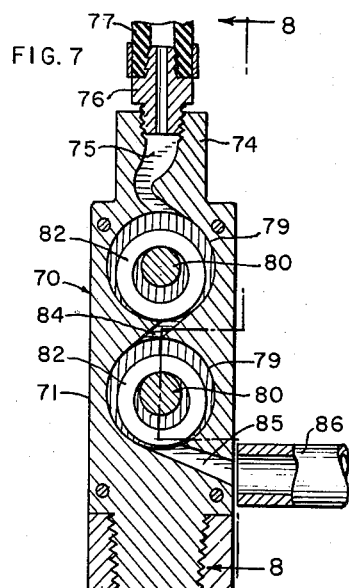
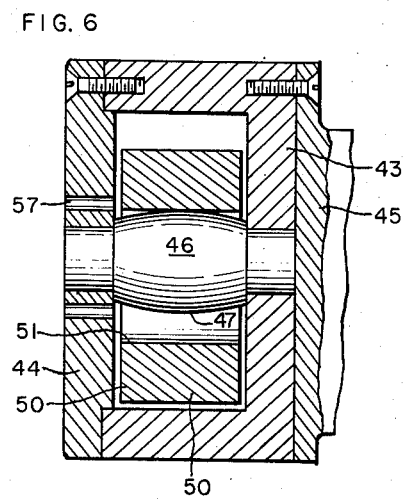
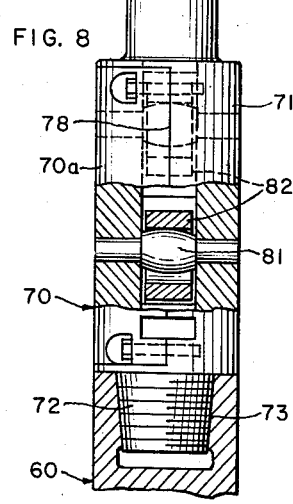
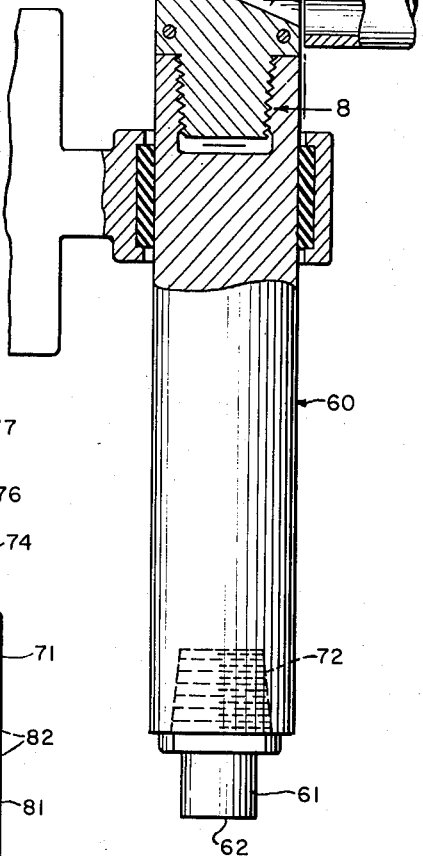
*INVENTOR.*
ALBERT G. BODINE JR.
BY
ATTORNEYS 3,191,911
FLUID DRIVEN MECHANICAL OSCILLATOR
Albert G. Bodine, Jr., Sherman Oaks, Calif.
(7877 Woodley Ave., Van Nuys, Calif.)
Filed May 26, 1961, Ser. No. 112,897
10 Claims. (Cl. 259—1)

This application is a continuation-in-part of a series of continuing applications, all interconnected by co-pendency, as follows: Apparatus for Generating and Transmitting Sonic Vibrations, Serial No. 484,627, filed January 28, 1955, now abandoned; Method and Apparatus for Generating and Transmitting Sonic Vibrations, Serial No. 825,117, filed July 6, 1959, now Patent No. 2,960,314; and Method and Apparatus for Generating and Transmitting Sonic Vibrations, Serial No. 55,537, filed September 12, 1960.

This invention relates generally to mechanical, fluid driven vibration generators, useful in various vibratory instruments, tools and machinery and in various industrial processes. Without intention of limitation, the frequency range in contemplation is from a few cycles per second to something of the order of fifteen or more kilocycles per second.

The general object of the present invention is the provision of a simple and relatively inexpensive, fluid driven, mechanical vibration generator of high performance, adaptable practically within a wide frequency spectrum, and having certain unique and important features of advantage, particularly as regards fluid drive.

One prior vibration generator involves a ball driven in an orbital path around the circular raceway by a stream of fluid jetted tangentially into the raceway. This ball exerts a centrifugal force on the raceway, which is transmitted to whatever body is attached to the raceway. The ball of this generator thus exerts a rotating force vector against the raceway and thence against such attached member or body; and a component of this force vector along any desired direction line or lines within the plane of vector rotation can be utilized as a cyclic shaking force. A desirable form of this device, giving high shaking force amplitude, or impulse, is one wherein the ball diameter is a large fraction, e.g., of the order of three quarters or more, of the diameter of the raceway. The larger this fraction, up to a point, the higher the impulse magnitude will be.

The ball and raceway type of vibration generator has received much attention, and is a useful device for many applications which are not too demanding. It does, however, have certain inherent limitations and problems. For example, assuming a ball in a raceway, and a large ratio of ball diameter to raceway diameter, so as to give desirably high impulse, and assuming four fluid jets spaced uniformly about the raceway, and directed tangentially into the raceway, it can readily be seen that the jet injected immediately behind the point of contact between the ball and the raceway will impinge on the outermost portion of the ball (the portion nearest the raceway), and rearwardly of its point of contact with the raceway. The ball is thereby driven forward along the raceway. It will be noted, however, that the surface of the ball receiving the jet stream will, because of rolling action on the raceway, be moving against the direction of the jet stream. It will also be noted that at other points around the raceway, and about the perimeter of the ball, the fluid stream is also moving contrary to the direction of motion of the ball surface. And, in the general region opposite the point of contact between the ball and race, the fluid stream is moving opposite to the direction of movement of the ball as a whole. The result is general turbulence, resistance to fluid flow, conflicting drive efforts on different portions of the ball, instability, including lateral wobble, and a positive refusal to deliver efficient or high performance output.

With this specific problem in mind, it is a particular and primary object of the invention to provide a fluid driven mechanical vibration generator of the general class discussed in the foregoing, which, however, is so physically reorganized that all portions of its fluid driven element move in the general direction of the fluid stream or streams impinging thereon.

According to the present invention, the orbital ball of the older type generator is replaced by a ring, and the raceway by a pin extending loosely, or with clearance, through the ring. The ring, which is fluid driven, gyrates about the pin somewhat after the manner of a hoop whirling about a stick. One or more fluid jets are oriented to project fluid streams generally tangentially toward the ring, and these jets are discharged from nozzles typically in the wall of a surrounding cylindrical casing whose outer wall is preferably of just sufficient inside diameter to accommodate the gyrating ring. The fluid used for the driving of the ring may be a gas, liquid or steam. In practice, air is very effective.

For the purpose of some applications, the ring may advantageously have vanes or buckets to receive the fluid jets. When the ring engages the pin, the center of gravity of the ring is offset a short distance from the center of gravity of the pin. When impinged upon by the air jets, the ring does not spin on the pin like a wheel with a plain bearing on a shaft, but rolls on the pin without substantial slippage, and gyrates. The center of gravity of the ring moves in a circular path around the center of the pin and the ring exerts a centrifugal force on the pin in a direction line extending through the center of the pin and the center of gravity of the ring. A force vector acts on the pin along this direction line, and of course rotates about the center of the pin with the center of gravity of the gyrating ring.

In this ring and pin generator, the fluid jets all strike the ring generally tangentially and in the general direction of the desired motion of the ring. No portion of the ring moves in opposition to the contacting fluid stream spinning around the casing. Accordingly, resistance to fluid flow is very materially reduced, and the fluid can be forced through the device at greatly increased velocity, permitting, in turn, greatly increased gyration frequency.

The frequency of the rotating force vector delivered by the generator, i.e., the number of circuits per second of the point of contact between the ring and pin, exceeds the rate of rotation of the ring about its own center. For example, with a pin of relatively large diameter in relation to the inside diameter of the ring, the ring may rotate on its own axis through only a comparatively few degrees while rolling once entirely around the pin. Thus a substantial frequency multiplication is available. For example, by fluid driving the ring at 1000 revolutions per second, the force vector (output frequency) can easily be designed to turn at 7000 revolutions per second. The ring and pin form of generator facilitate this frequency multiplication effect in that the air stream impinging on the outer portion of the ring, or on a vane on the ring, directly opposite the point of contact between the pin and ring, exerts a torque on the ring with said point of contact as a center or fulcrum point. This torque acts to rock or turn the ring constantly about the pin by a torque exerted on the ring about the point of contact between the ring and pin.

Another unique advantage peculiar to the fluid-driven-ring and pin form of generator, particularly where the gyrating ring is arranged to have only small clearance with the wall of the confining casing, is that, in contradistinction to the ball and raceway generator, the rotating element (ring) is driven by a positive displacement effect.

Thus, consider the ring to be in contact with the pin, so that its periphery, at a point 180° removed from the pin, is then near or adjacent the side wall of the casing. A jet stream, directed into the crescent-shaped space between the casing wall and this near point of the ring, then acts against the periphery of the ring to move the ring on and out of the way of the jet stream, which is otherwise blocked off. The ring thus functions as a positive displacement device.

The ring and pin form of generator has some additional advantages over the ball and raceway form, one of which is that the gyratory ring is of larger diameter than an oribtal ball for comparable impulse. The ring can therefore be laterally guided at an increased radius, and its lateral stability can therefore be more effectively controlled. This is a problem peculiar to fluid drive in this type of generator. The ball and raceway type of generator utilizing fluid stream drive is particularly subject to lateral instability and wobble. Better lateral guidance in the ring and pin type, as explained above, aids lateral stability. The ring is thus adequately constrained laterally notwithstanding variations or flutter in the fluid drive. Another advantage is that the ring and pin generator can be practically designed with a closer ratio of diameters of circular bearing surfaces than can the ball and raceway generators, meaning that greater bearing area can be afforded in the case of the ring and pin. Another advantage is the inherent compactness and concentration of mass in the pin, considered as the vibration take-off means, as compared with a ball race.

The invention will now be disclosed in certain present illustrative forms, reference being directed to the accompanying drawings, in which:

FIG. 5 is a medial section through a modified vibration generator;

FIG. 6 is a section taken on line 6—6 of FIG. 5;

FIG. 7 is a side elevation, partly in section, of a further modified form of the invention; and FIG. 8 is a view taken in accordance with broken line 8—8 of FIG. 7.

Figure 1:
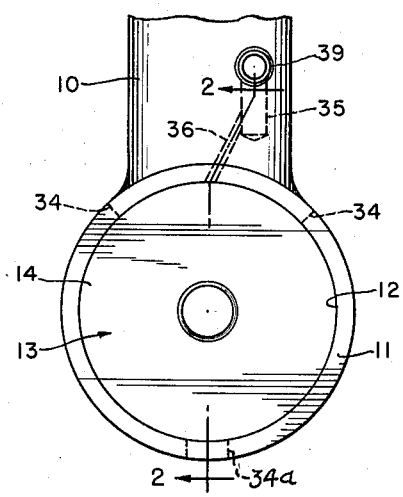
FIG. 1 is a side elevation of a vibration generator in accordance with the invention applied to a fragmentarily illustrated body.
Figure 2:
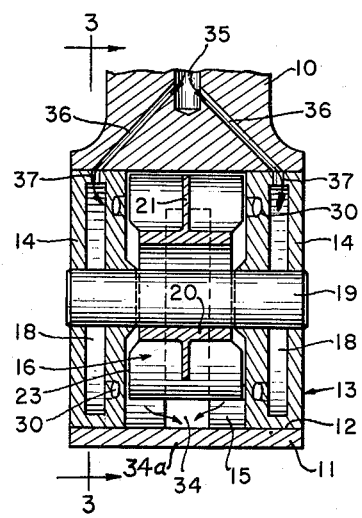
FIG. 2 is a section on line 2—2 of FIG. 1.
Figure 3:
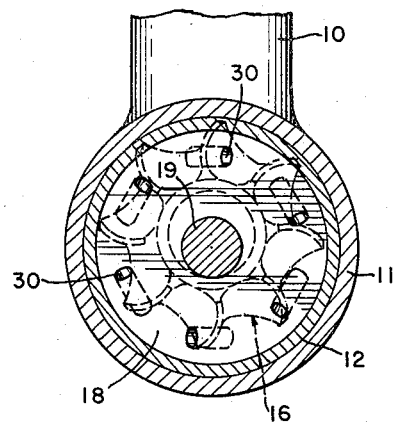
FIG. 3 is a section on line 3—3 of FIG. 2.
Figure 4:
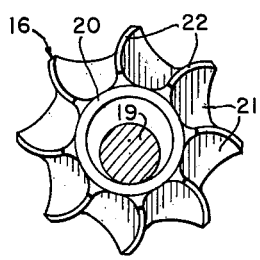
FIG. 4 is a detail side elevation of the rotor of FIGS. 1–3.

Referring first to the embodiment of the invention shown in FIGS. 1–4, a bar constituting a body to be vibrated is fragmentarily indicated at 10. The illustrated end of the bar is formed with a cylindrical hub 11, into whose bore 12 is press-fitted the vibration generator generally designated at 13. Two circular or disk-like side plates 14 are press-fitted into bore 12 at a spacing to provide a cylindrical chamber 15 for the presently described rotor or ring 16. The side plates 13 are hollowed out to provide manifold cavities 18, and tightly mount an axial bearing pin 19 which extends across rotor chamber 15. Rotor 16, which can advantageously be fabricated of ball bearing steel, or steel of like hardness, comprises a relatively thin hub 20 receiving the pin 19 with a clearance of the typical proportions shown. Integral with hub 20 is a medial, radially extending web 21, on opposite sides of which are impeller vanes 22, formed integrally with hub 20 and web 21. These vanes 22 are curved, as best shown in FIG. 4, and of substantial area, preferably projecting laterally beyond the ends of the hub. The vanes are formed with radial, outside edges 23 parallel and very closely spaced to the inside surfaces of plates 14, the clearance being preferably of the order of .001 inch on each side, so as to prevent the rotor wobbling or otherwise becoming unstable in its high speed gyration. I have also found it desirable to provide a very high polish on the inside surfaces of the side plates so as to reduce friction between the rotor and these surfaces to a minimum.

A plurality of nozzle bores 30 are drilled through the inside walls of plates 13 between manifold chambers 18 and rotor chamber 15. These are preferably placed in a circular pattern around pin 19 in a pattern such as indicated in FIG. 3, and are oriented in a tangential direction with reference to rotor chamber 15. They are also preferably so positioned that the fluid jets delivered therefrom impinge on the vanes 22 as near as possible to their innermost junction with the rotor hub, so as to cause the air streams to flow radially outward along the vanes as they deliver energy thereto. It will be evident that this desirable condition can be more fully realized than as shown in FIG. 2, if the rotor hub has less clearance with the pin 19; and excellent performance has been attained in practice with very considerably less clearance proportions than as shown in the illustrative embodiment. There is great design freedom in this respect. The spent air flows off the peripheries of the rotor vanes, and is exhausted via discharge ports 34 formed in the periphery of hub 11, and spaced by a rib 34a. In this case, the ports 34 are formed medially in hub 11 and extend throughout an angle greater than 180°, here substantially three-quarters of a full circle.

The air manifold cavities 18 are fed with air under pressure via a bore 35 in bar 10 leading from an air inlet to a pair of branch passages 36 communicating with ports 37 in side plates 13 opening into cavities 18. A suitable inlet connection is made to bore 35 through the side of bar 10 as indicated at 39.

The very light whirling ring rotor is adapted for very high frequency operation, attention being directed to its lightness, and also to the impeller vanes formed thereon which extract considerably more work or energy from the jet streams than could a simple ring.

From the preliminary discussion, it will be understood that the rotor 16, under the influence of the air jets impinging on its blades 22, is driven to gyrate about the pin 19, the inside surface of the hub rolling on the pin. The rotor is driven ahead by the impact of the air stream on the vanes, and its point of contact with the air is rolled about the pin by the torque exerted on the rotor by the air stream impinging on the vane just outside said point of contact. It will further be evident that all portions of the rotor receiving airflow from the nozzles are moving in the general directions of the received airflows, so that conflicting drive efforts are avoided, and turbulence minimized. It will be apparent that the edges of the rotor by which it is laterally guided, in this case, the edges of the blades, are at a considerable radial distance from the axis of the pin as compared with the eccentricity of the center of gravity. This relationship is a very desirable one, in that the rotor is thereby very well constrained against lateral wobble, assuring good stability, notwithstanding the variabilities of fluid stream drive. From FIG. 3 it will be observed that the radii of curvature of the pin 19 and the inside surface of the hub 20 are not greatly disproportionate, assuring good bearing area therebetween. Attention is also directed to the compact nature of the vibration receiving pin 19, which constitutes a most effective means for receiving the vibratory impulses exerted thereon by the rotor and for applying same to the body to be vibrated.

It will of course be understood that the rotor 16 exerts on the pin 19 a rotating force vector, rotating in a plane at right angles to the pin. Components of vibration in any direction in this plane can be utilized, as will be readily understood by those skilled in the art.

Reference is next directed to the embodiment of FIGS. 5 and 6. The vibration generator in this case comprises a cylindric housing 40, formed with a cylindric chamber 41. This housing 40 is formed with one integral side closure wall 43, and its opposite side is fitted with a removable side closure wall 44. A flanged fitting 45 is secured to the wall 43, and constitutes a means by which generated vibrations are transmitted to the work. A center pin or axle 46 of circular cross-section, preferably formed with a central crowned or barrel-shaped portion 47, has reduced end portions set tightly into wall members 43 and 44, as shown. The periphery of this axle provides a circular roller bearing surface, which is surrounded by inertia rotor ring 50 having a circular, smooth-surfaced central opening 51 of somewhat larger diameter than that of the axle. Preferably, the outer periphery of the ring has but small clearance with the periphery of the chamber 41 when hanging on the axle, or spinning thereabout.

The inertia ring 50 is caused to roll on its axle by a fluid jet, either air under pressure, steam, or a liquid, introduced through an injection nozzle 55 formed in the housing tangential to the periphery of the circular cavity, such fluid being introduced to the nozzle 55 via a hose, not shown, coupled thereto. The spent driving fluid may be discharged from the chamber in any desired manner; as here shown, it is vented to atmosphere via orifices 57 formed in side plate 44 as close to the center of the chamber as possible.

The tangentially introduced fluid causes the inertia ring 50 to roll on the axle, and the centrifugal force exerted by the rolling ring on the axle, and thence transmitted through the fitting to the work, exerts on the latter a force vector which intersects the axis of the axle, and constantly rotates in a plane parallel to that of the gyration of the ring 50.

The embodiment of FIGS. 5 and 6 is illustrative of the use of a ring which may be spun by the use of an introduced air jet merely by the impingement of the latter on its periphery, entirely without benefit of vanes or scoops. With particular reference to FIG. 5, it will be seen that, in the position of the ring shown therein, the introduced air jet impinges on the periphery of the ring in a region of the chamber 41 which gradually pinches out, so that the ring is driven forward by a positive displacement effect whenever passing through the position shown illustrated. Of course, it will be quite evident that a plurality of the nozzles 55 may be used about the periphery of the chamber, as is suggested by the embodiment of FIGS. 1–4. The embodiment of FIGS. 5 and 6 has many of the advantages of that of FIGS. 1–4, including particularly ring motion always in the direction of injected fluid, as fully discussed in connection with FIGS. 1–4. The embodiment of FIGS. 5 and 6 has the additional advantage of great simplicity and low cost of construction.

For a given size ring, the performance of a given ring and pin generator is limited by a critical velocity beyond which the air cannot be driven. When the ring attains this velocity, further driving effort cannot be added. Accordingly, for high frequency and high power applications, I use a plurality of the pin and ring devices, which, under certain circumstances, are able to synchronize with one another. In FIGS. 7 and 8, for example, I have shown a practical application of plural ring and pin type generator devices to a sonic polishing tool. Numeral 60 designates generally a cylindrical elastic bar, composed of some good elastic material such as steel, to the lower end of which has been secured a vibratory polishing or grinding head 61 having a flat end extremity 62 adapted to be applied to the surface of the work.

The sonic vibration generator, designated by numeral 70, comprises a cylindrical body 71 formed at its lower end with a threaded coupling pin 72 screwed into an internally threaded box 73 at the upper end of rod 60. The upper reduced end portion 74 of the body 71 has a fluid passage 75 extending therethrough, to which is coupled, as indicated at 76, a hose 77 understood to be supplied with air under suitable pressure. The body 70 includes a removable body part 70a, meeting the remainder of the body on a vertical medial parting plane 78, and secured in position by suitable screws as shown. A vertical series of circular chambers 79, here two in number, are formed in the body 70, between the main body part and the insert part 70a, as clearly shown, and axles 80 intersect these chambers, being mounted in the body as illustrated. These axles, whose central portions are preferably crowned, as indicated at 81, support inertia rings 82, the rings 82 being adapted to be rolled about the axles 80 and the centrifugal force of the spinning rings being exerted on the generator housing or body through the axles 80.

The aforementioned fluid passage 75 joins the upper cavity 79 in a tangential direction, as shown; and a passageway 84 extends tangentially to the upper cavity 79 and also tangentially to the lower cavity 79, the arrangement being such however, that the fluid introduced to the two cavities will spin in opposite directions as compared with one another. A tangential outlet passage 85 leads outwardly through the side of the generator body, and the discharged fluid may be received by a stationarily positioned outlet pipe 86, supported separately of the generator.

The inertia rings 82 in the upper and lower cavities are caused to roll on their axles 80, in opposite directions of rotation, by the stream of pressurized air introduced tangentially thereto, as earlier described. As will appear, the air from the source is introduced tangentially to the upper chamber 79, spinning thereabout and forcing the ring 82 to roll about the axle 80. Some of this air is constantly discharged tangentially via the passage 84, to be introduced to the lower chamber 79 in a tangential direction, spinning about the latter chamber in a direction contrary to the spin direction for the chamber immediately above, and accordingly causing the lower ring 82 to spin with a direction opposite to that of the upper ring 82. Air from lower chamber 79 is also constantly discharged tangentially via the outlet passage 85.

In general, pressure fluid circulated successively through the chambers 79 would cause the described rotations of the inertia rings, but without frequency control, and the phase relations between the two rings would be at random. However, when the rings are driven by the stream of pressure fluid so as to spin about the axles at a number of revolutions per second approaching or approximating the resonant frequency of the rod 60 for a longitudinal mode of elastic standing wave vibration, the rod 60, as a result of some initial force impact received from the generator, is started into its longitudinal mode of resonant standing wave vibration. As a result of this action, the spinning inertia rings 82 synchronize with the longitudinal motion of the upper end portion of the rod 60, and therefore with one another. In other words, the rings orient themselves, though spinning in opposite directions, so as to move in a power delivering phase relationship in the direction longitudinally of the vibrating rod 60. Moreover, as the rings thus synchronize themselves with one another and with the motion of the rod 60, the vertically directed forces which they exert through the generator body against the upper end portion of the rod synchronize with one another, so that the forces become fully additive in the direction longitudinally of the rod. Upon synchronism of the rings 82 being thus achieved, maximum effective force is delivered to the vibratory rod 60 in the direction longitudinally thereof, setting the same into high amplitude longitudinal half-wave elastic vibration.

It will be understood, of course, that the illustrative embodiments illustrated and described are not limitative on the invention, and that various changes in design, structure, and arrangement may be made without departing from the spirit and scope of the invention or of the appended claims.

I claim:

1. In a vibration generator, the combination of: a pin, an inertia ring of larger inside diameter than the diameter of said pin encircling said pin, so that said ring is capable of rolling on said pin and gyrating thereabout with its center of gravity describing a circle about the longitudinal axis of said pin, and a nozzle oriented to direct a jet of fluid toward said ring with a component of velocity tangential thereto so as to impinge on the ring and cause it to gyrate about said pin.

2. In a vibration generator, the combination of: a pin, an inertia ring of larger inside diameter than the diameter of said pin encircling said pin, so that said ring is capable of rolling on said pin and gyrating thereabout with its center of gravity describing a circle about the longitudinal axis of said pin, and a nozzle oriented to direct a jet of air toward the outside periphery of said ring with a component of velocity tangential thereto so as to impinge on the ring and cause it to gyrate about said pin.

3. In a vibration generator, the combination of: a pin, an inertia rotor having a central bore of larger diameter than the diameter of said pin encircling said pin, so that said rotor is capable of rolling on said pin and gyrating thereabout with its center of gravity describing a circle about the longitudinal axis of said pin, and nozzles for directing jets of air from opposite sides of the rotor toward and tangentially of the rotor so as to impinge on the rotor and cause it to gyrate about said pin.

4. The subject matter of claim 1, including also walls fixed with said pin and having inertia-ring guiding surfaces positioned in parallel planes transverse to said pin and closely spaced to opposite sides of said ring.

5. In a vibration generator, the combination of: a housing having a chamber of circular cross-section, a pin mounted in said housing and extending axially across said chamber, an inertia ring of larger inside diameter than the diameter of said pin encircling said pin, so that said ring is capable of rolling on said pin and gyrating thereabout with its center of gravity describing a circle about the longitudinal axis of said pin, and a fluid nozzle in said housing oriented to direct a jet air toward said ring with a component of velocity tangential thereto so as to impinge on the ring and cause it to gyrate about said pin.

6. In a vibration generator, the combination of: a housing comprised of a peripheral wall defining the periphery of a chamber of circular cross-section, and a pair of spaced side walls defining the sides of said chamber, a pin fixed in said side walls and extending axially across said chamber, an inertia ring of inside diameter exceeding the diameter of said pin encircling said pin, the outside diameter of said ring having a small clearance with the inside surface of said peripheral housing wall, and a fluid nozzle in said peripheral housing wall directed tangentially toward said ring.

7. In a vibration generator, the combination of: a housing comprised of a peripheral wall defining the periphery of a chamber of circular cross-section, and a pair of spaced side walls defining the sides of said chamber, a pin fixed in said side walls and extending axially across said chamber, an inertia ring of inside diameter exceeding the diameter of said pin so that the ring can roll around the pin, encircling said pin, and fluid nozzles in said side walls of said housing directed inwardly toward and tangentially of said inertia ring, said housing having a fluid exhaust port leading therefrom.

8. The subject matter of claim 7, wherein said inertia ring includes vanes impinged upon by the fluid streams from said nozzles, said vanes being shaped to receive said fluid streams laterally, and including laterally facing surfaces opposed to said streams to deflect said streams radially outward, and including outermost discharge edges open to the peripheral region of said chamber off which the deflected air streams are discharged to said region.

9. In a vibration generator, the combination of: a pin, an inertia rotor having a central bore of larger diameter than the diameter of said pin encircling said pin, so that said rotor is capable of rolling on said pin and gyrating thereabout with its center of gravity describing a circle about the longitudinal axis of said pin, and nozzle means for directing jets of air tangentially toward said ring from a plurality of points regularly spaced about said pin.

10. In a vibration generator, the combination of: a housing comprised of a peripheral wall defining the periphery of a chamber of circular cross-section, and a pair of spaced side walls defining the sides of said chamber, a pin fixed in said side walls and extending axially across said chamber, an inertia ring of inside diameter exceeding the diameter of said pin encircling said pin, and a plurality of fluid nozzles spaced about said chamber directed generally tangentially into said chamber and against said ring, said housing having a fluid exhaust port leading therefrom.

References Cited by the Examiner

UNITED STATES PATENTS

| | | |
|---|---|---|
| 437,892 | 10/90 | Hollar _____ 253—74 |
| 2,496,291 | 2/50 | High _____ 259 |
| 2,675,777 | 4/54 | Lachaise. |
| 2,834,584 | 5/58 | Bondeson et al. _____ 259—1 |
| 2,960,314 | 11/60 | Bodine _____ 259—1 X |

FOREIGN PATENTS 16,292    7/12    Great Britain.

CHARLES A. WILLMUTH, *Primary Examiner.*

LEO QUACKENBUSH, *Examiner.*